United States Patent
Ou-Young

(10) Patent No.: US 7,478,590 B2
(45) Date of Patent: Jan. 20, 2009

(54) FOLDING CONTROL APPARATUS FOR LEFT AND RIGHT LATERAL PIECES OF SLICE FOOD

(76) Inventor: Robert Ou-Young, 5F, No. 52, Lane 148, Li-De St., Chung-Ho City, Taipei Hsien (TW)

( * ) Notice: Subject to any disclaimer, the term of this patent is extended or adjusted under 35 U.S.C. 154(b) by 43 days.

(21) Appl. No.: 11/567,390

(22) Filed: Dec. 6, 2006

(65) Prior Publication Data
US 2008/0135458 A1 Jun. 12, 2008

(51) Int. Cl.
*A23L 1/00* (2006.01)
(52) U.S. Cl. ............ 99/450.2; 99/353; 99/450.1
(58) Field of Classification Search .......... 99/352–355, 99/494, 516, 450.1, 450.2, 450.6, 450.7, 99/450.8; 425/132, 142, 308, 466, 131.1, 425/133.1; 426/503, 512; 209/3.2
See application file for complete search history.

(56) References Cited

U.S. PATENT DOCUMENTS

| | | | | | |
|---|---|---|---|---|---|
| 2,568,491 | A | * | 9/1951 | Edwards | 425/133.1 |
| 4,207,281 | A | * | 6/1980 | Bernard | 264/176.1 |
| 4,692,109 | A | * | 9/1987 | Hayashi et al. | 425/308 |
| 4,734,024 | A | * | 3/1988 | Tashiro | 425/132 |
| 6,234,779 | B1 | * | 5/2001 | Ou-Young | 425/132 |
| 6,321,642 | B1 | * | 11/2001 | Ou-Young | 99/494 |
| 6,477,944 | B1 | * | 11/2002 | Ou-Young | 99/450.2 |

* cited by examiner

*Primary Examiner*—Timothy F. Simone
(74) *Attorney, Agent, or Firm*—Lowe Hauptman Ham & Berner, LLP

(57) ABSTRACT

A folding control apparatus for left and right lateral pieces of slice food is provided, such that when the slice food is moving forward on a transfer belt surface, the slice food is attached and positioned on the transfer belt surface; and a left and right lateral pieces of the slice food are blown by high-pressure air at a different time sequence to be folded and overlapped with respect to each other, so as to cover a stuffing strip on a surface of the slice food for forming a food enclosing material, thereby further simplifying a structure for folding the slice food to reduce a manufacturing cost and lower noise.

5 Claims, 4 Drawing Sheets

FOLDING CONTROL APPARATUS FOR LEFT AND RIGHT LATERAL PIECES OF SLICE FOOD

BACKGROUND OF THE INVENTION a) Field of the Invention

The present invention relates to a folding control apparatus for left and right lateral pieces of slice food, and more particularly to a folding control apparatus which is used in a process of transferring forward the slice food on a transfer belt surface, such that the left and right lateral pieces of the slice food are folded respectively at a different time sequence by a momentary blow of high-pressure air to cover stuffing strips, thereby forming a food enclosing material.

b) Description of the Prior Art

A typical facility used for folding strip food, such as a strip of a raw or cooked dough or a rice product, to cover a stuffing strip, is shown in FIGS. 3, 7, 8, 9, 10, 11 in a prior U.S. publication No. US2005/0092186A1 created by the present inventor, wherein in a process of transferring a soft and deformable thin outer material (10) by a transfer device (20), left and right blades (30, 30') are moving forward along with the transfer device 20 synchronously, and when the left and right blades (30, 30') are passing through two projected arc-shape sheets (36, 37,) two lateral sides of the outer material (10) are folded by the left and right blades (30, 30') to cover a stuffing strip (40). The shortcomings of this facility lie in that the left and right blades (30, 30') are numerous and driven by chains (35); therefore the facility is provided with a lot of components and a complex structure, produces a loud transmission noise when the chains (35) and the blades (30, 30') are moving, and is not easy to be cleaned. Accordingly, how to design a folding apparatus for the strip food which is provided with a simplified structure, a reduced manufacturing cost, and a significantly lowered noise is a technical issue to be resolved by the present inventor.

SUMMARY OF THE INVENTION

The primary object of present invention is to provide a folding control apparatus for left and right lateral pieces of slice food, wherein the slice food is attached and positioned on a transfer belt surface when the slice food is moving forward on the transfer belt surface, and the left and right lateral pieces of the slice food are blown by high-pressure air at a different time sequence to be folded and overlapped with respect to each other, so as to cover a stuffing strip on the slice food surface for forming a food enclosing material, thereby further simplifying a structure and facility for folding the slice food to reduce a manufacturing cost and lower noise.

Another object of the present invention is to provide a folding control apparatus for left and right lateral pieces of slice food to increase an accuracy of folding and overlapping the left and right lateral pieces of the slice food, thereby truly achieving a constant shape of an entire food enclosing material after covering a stuffing strip.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 2:
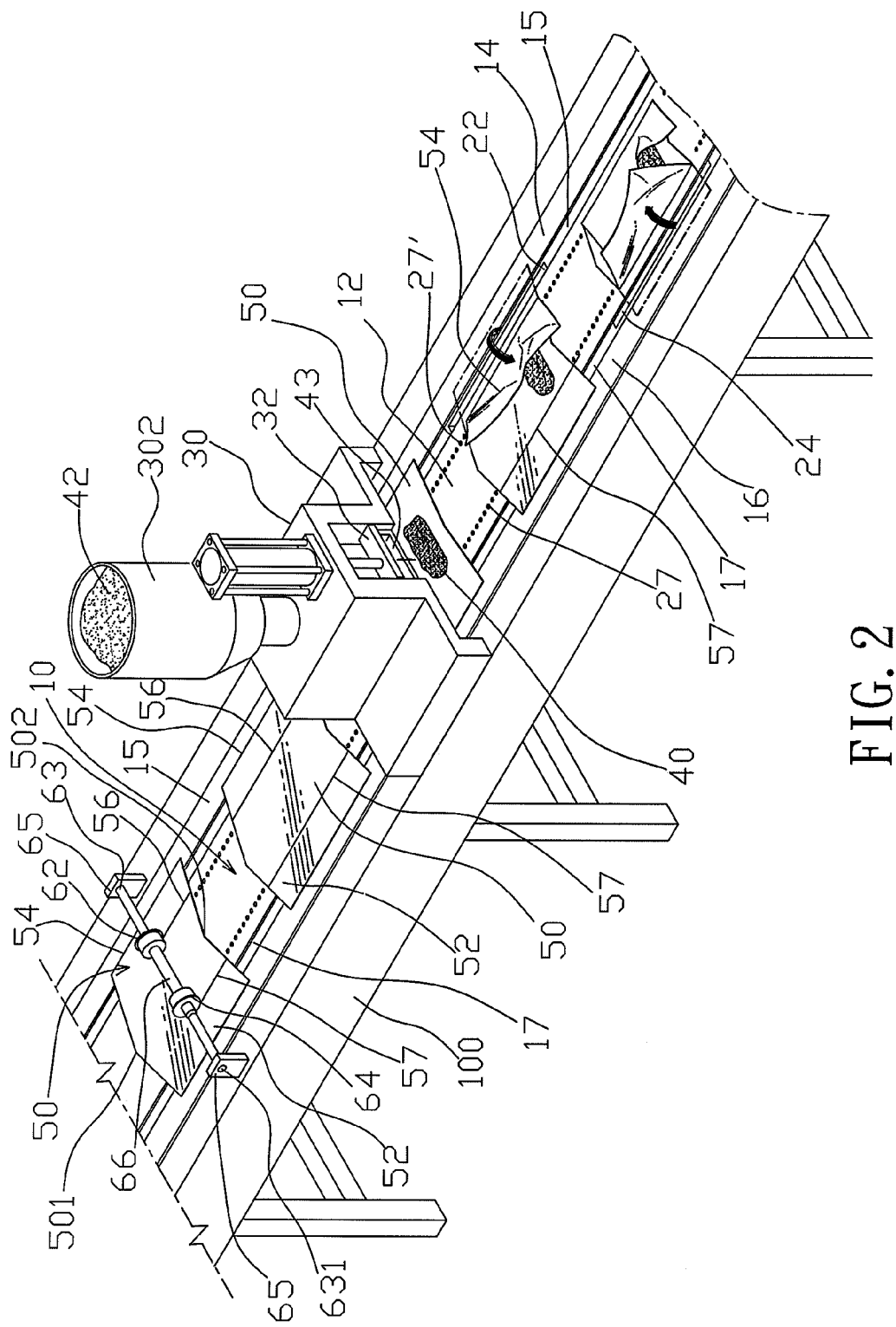
FIG. 2 shows a schematic view of a continuous operation that strip food according to the present invention is processed into a food enclosing material by a processing material.
Figure 3:
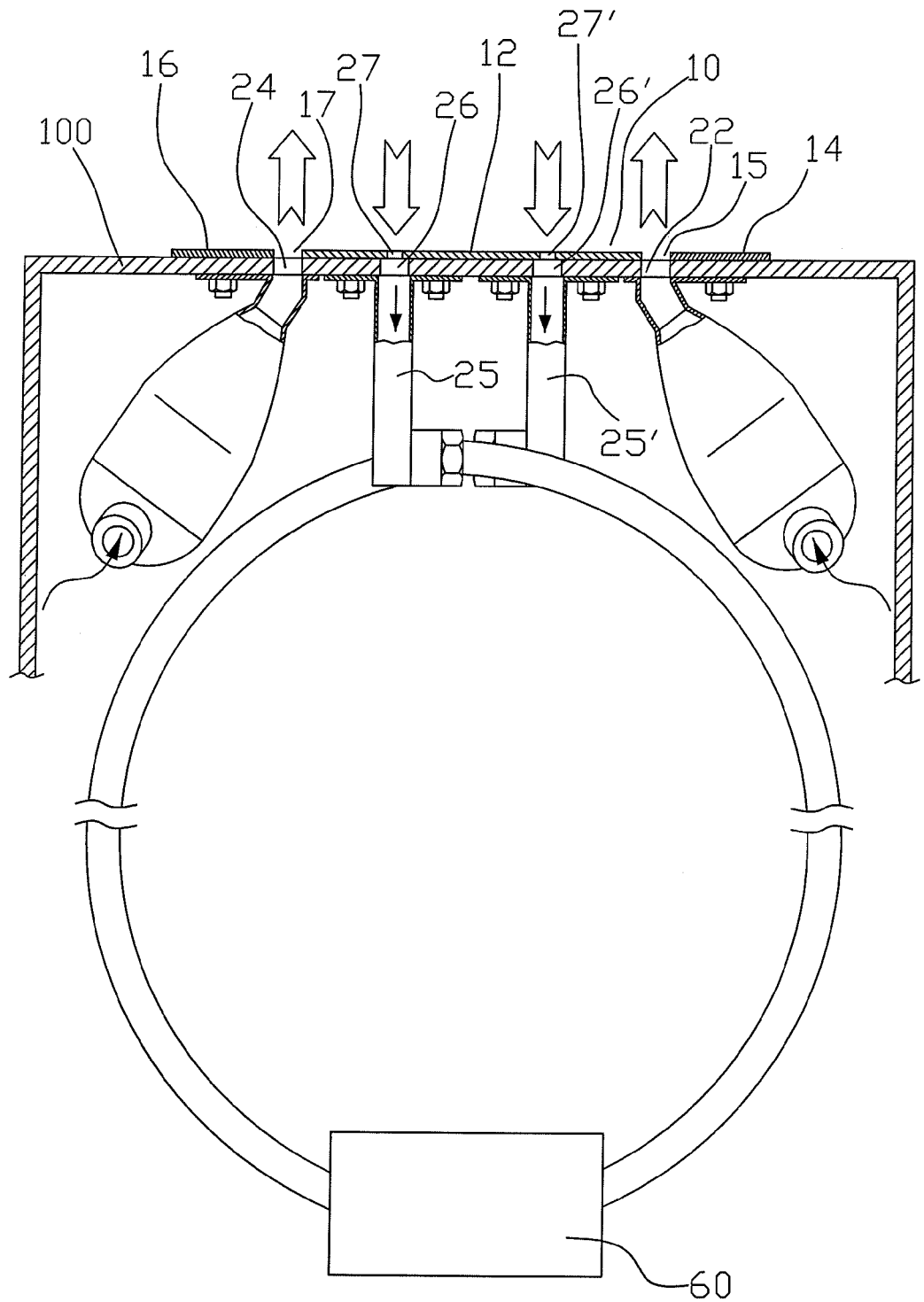
FIG. 3 shows a cutaway view according to the present invention.

Referring to FIG. 2, the present invention is to provide a folding control apparatus for left and right lateral pieces of slice food, including a platform 100 which is provided with a transfer belt 10 that moves horizontally along a specific direction cyclically and is divided into a central transfer belt 12, a right transfer belt 14, and a left transfer belt 16, with a first gap 15 being located between the right transfer belt 14 and the central transfer belt 12, and a second gap 17 being located between the left transfer belt 16 and the central transfer belt 12; a right air nozzle 22 which is installed on a surface of the platform 100 in correspondence with the first gap 15; a left air nozzle 24 which is installed on the surface of platform 100 in correspondence with the second gap 17; at least more than one row of air suction grooves 26, 26', as shown in FIG. 3, which are installed on the surface of platform 100, below the central transfer belt 12; and at least more than one row of through-holes 27, 27' which are installed on the central transfer belt 12 and are in correspondence with the air suction grooves 26, 26' forming air suction passageways where the air is sucked in by the air suction grooves 26, 26' via the through-holes 27, 27'.

The platform 100 is installed with a stuffing feeder 30 (as shown in FIG. 2), which is provided with a transversal push plate 32 that can be moved up and down intermittently under a pneumatic control. An inner side of the push plate 32 is provided with an outlet 43 of a stuffing strip 40, allowing the stuffing strip 40 to be exported from the outlet 43. When the push plate 32 is moved downward vertically, the stuffing strip 40 will be pushed onto a surface of moving slice food 50.

Referring to FIG. 2, two thin rolling disks 62, 64 are fixed on left and right sides of a shaft 66, and two connection ends 63, 631 of the shaft 66 are loosely connected on frames 65 respectively. These two frames 65 are fixed on two lateral surfaces of the platform 100, respectively. The two thin rolling disks 62, 64 are installed on the transfer belt 10 in front of the stuffing feeder 30, leaving with gaps between the surface of central transfer belt 12.

Referring to FIG. 2, the soft and deformable slice food 50 are fed onto the surface of transfer belt 10, a left lateral piece 52 is covered on surfaces of the second gap 17 and the left transfer belt 16, and a right lateral piece 54 is covered on surfaces of the first gap 15 and the right transfer belt 14.

The slice food 50 moves along with the transfer belt 10, and when the moving slice food 50 passes through the gaps below the two rolling disks 62, 64, the two rolling disks 62, 64 will be passively rotated by a push of the slice food 50 to form a texture of linear stress marks 56, 57 that are spaced apart at a left and right side, on the surface of the slice food 50.

Figure 4:
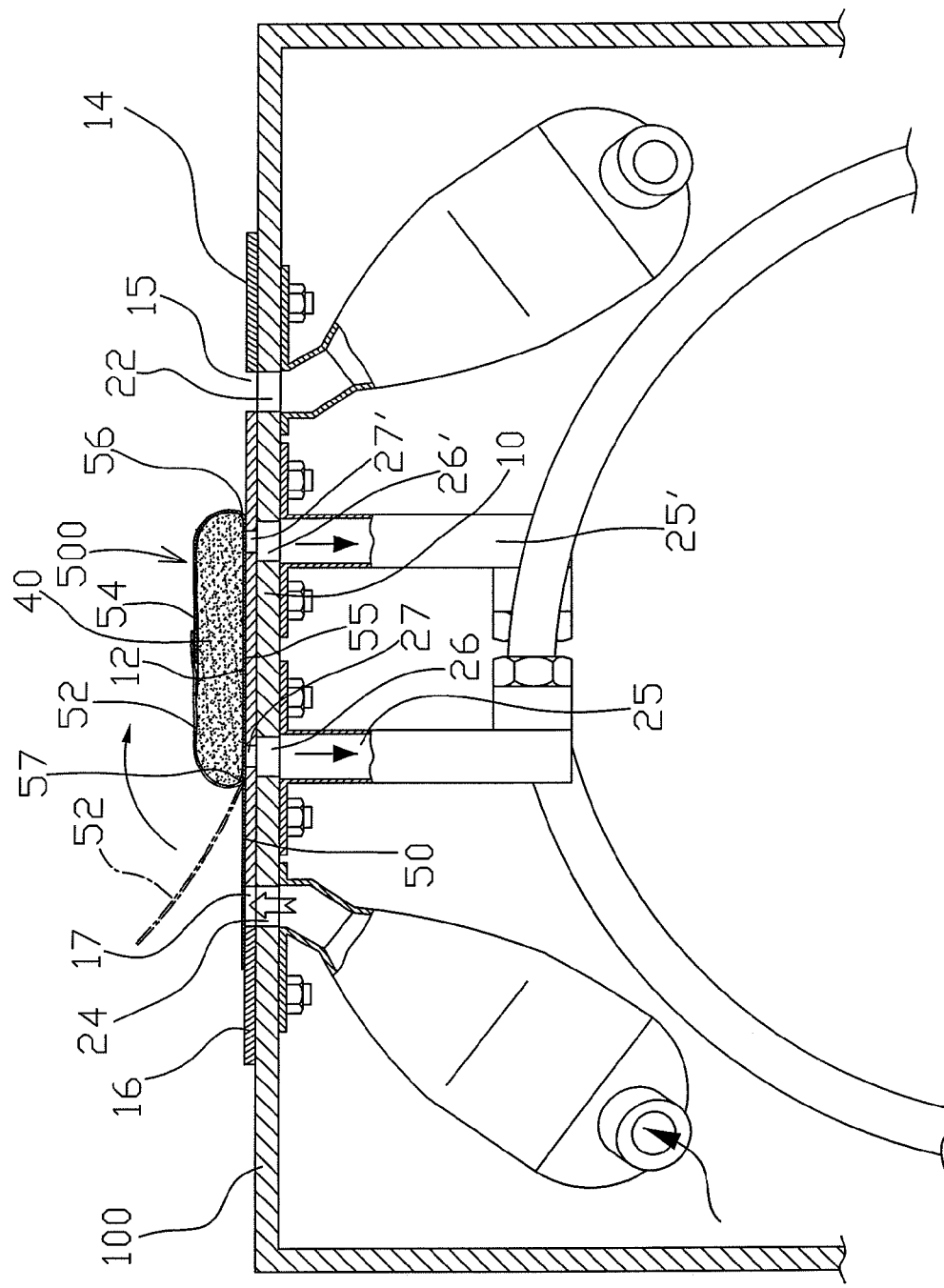
FIG. 4 shows a cutaway view of an operation that left and right lateral pieces of strip food according to the present invention are folded and overlapped.

Referring to FIG. 2 and FIG. 4, a primary bottom surface 55 of the slice food 50 is sucked by an suction effect of the air suction grooves 26, 26' via the through-holes 27, 27', such that the slice food 50 is attached and positioned on the surface of the central transfer belt 12, The left air nozzle 24 and the right air nozzle 22 blow out high-pressure air at a different time sequence through the first and second gaps 15, 17 momentarily, and then pause. Next, the left and right lateral pieces 52, 54 are folded against the linear stress marks 56, 57 at the different sequence, and are turned over at about 180°, such that the left and right lateral pieces 52, 54 are folded and overlapped on the surface of the stuffing strip 40, thereby forming a food enclosing material 500 (as shown in FIG. 1).

Referring to FIG. 2, a transfer belt 10 is divided into a central transfer belt 12, a right transfer belt 14, and a left transfer belt 16; therefore, the central transfer belt 12, the right transfer belt 14, and the left transfer belt 16 are moving horizontally and cyclically on a surface of a platform 100 synchronously.

Figure 1:
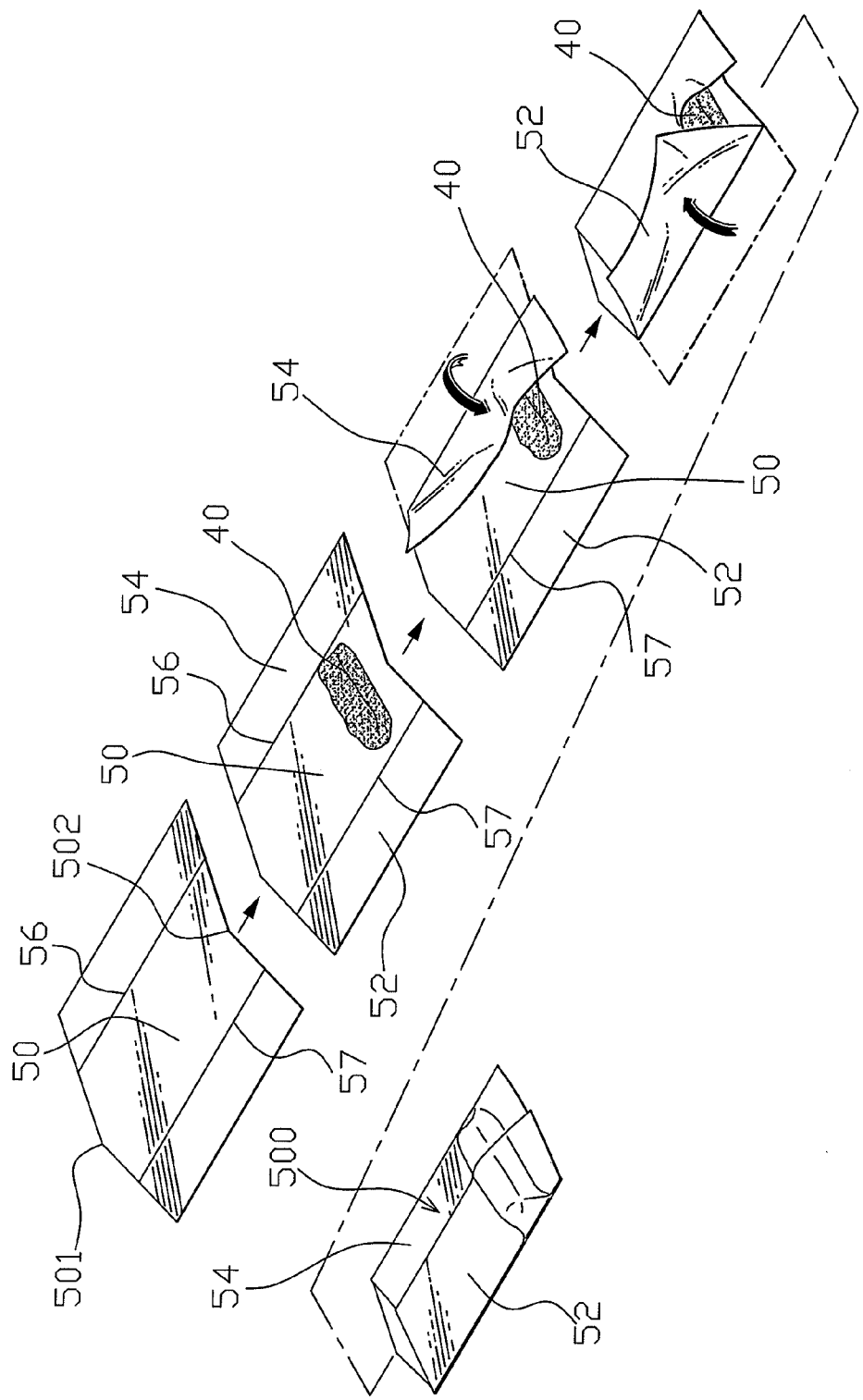
FIG. 1 shows a perspective view according to the present invention.

Referring to FIG. 1 and FIG. 2, a plurality of raw or cooked slice food 50 is emplaced on a surface of the transfer belt 10 at an equal distance. The slice food 50 can be in a rectangular, square, polygonal, circular, or elliptic shape; the shape can be designed according to a designer's requirement, wherein a front center is formed with a tip part 501, and a rear end is formed with a concave part 502. The slice food 50 can be made by a flour product, a rice product, or other food product, with an average thickness being controlled to be between 0.1 mm and 1.5 mm.

Referring to FIG. 4, left and right lateral pieces 52, 54 of the slice food 50 are distributed on surfaces of the left and right transfer belts 16, 14, and a primary bottom surface 55 is distributed on the central transfer belt 12.

Referring to FIG. 2, the slice food 50 moves forward along with the transfer belt 10 synchronously. As there is a gap between rolling disks 62, 64 and the central transfer belt 12, and a thickness of the slice food 50 is larger than that of the gap, when the slice food 50 passes through the gap, a surface of the slice food 50 will contact and push the two rolling disks 62, 64 such that the two rolling disks 62, 64 are rotated passively. While the rolling disks 62, 64 are rotating, they will form two linear stress marks 56, 57 on a surface of the slice food 50, and a shaft 66 will be rotated by an angle passively in frames 65, along with the rolling disks 62, 64.

Referring to FIG. 2, a stuffing feeder 30 is provided with a stuffing collection barrel 302 to store soft stuffing 42. The local soft stuffing 42 is intermittently squeezed out of an outlet 43 by a push element (not shown in the drawing) in an interior of the stuffing feeder 30 to form the stuffing strip 40, and a push plate 32 is moved downward vertically to transfer the stuffing strip 40 onto an upper surface of the slice food 50 almost transversally. The slice food 50 moves horizontally toward one side along with the transfer belt 10, and while the slice food 50 is moving, as shown in FIG. 3 and FIG. 4, air suction passageways 25, 25' that are formed by air suction grooves 26, 26' and through-holes 27, 27' are always under a suction condition under an operation of a suction pump 60. Therefore, a bottom surface 55 of each piece of the slice food 50 is always attached and positioned on the surface of the central transfer belt 12. When one piece of the slice food 50 moves underneath the stuffing feeder 30 along with the transfer belt 10, the stuffing feeder 30 will operate under a control of a detector (not shown in the drawing) to squeeze the soft stuffing 42 out of the outlet 43, which is in a shape of a long strip, as the stuffing strip 40, and the stuffing strip 40 will be pushed down immediately by the push plate 32 which moves downward. The push plate 32 can move up and down intermittently under a control of a pneumatic piston, and when the stuffing strip 40 is pushed down by the push plate 32 almost transversally to be emplaced on the surface of the slice food 50, the push plate 32 will move up to a top dead point immediately to wait for a next operation. The slice food 50 continues to move forward along with the transfer belt 10, and only until the right lateral piece 54 is completely moved to a top of a right air nozzle 22 that the right air nozzle 22 can start to eject high-pressure air. If the right air nozzle 22 is not completely covered by the right lateral piece 54, the air will not be ejected. Therefore, when the right air nozzle 22 is ejecting the air, the high-pressure air will pass through a first gap 15 to forcefully blow upward the right lateral piece 54 momentarily. As the bottom surface 55 of the slice food 50 is always attached and positioned, the right lateral piece 54 will be folded in a large angle against the linear stress mark 56. As the slice food 50 is very thin, and is provided with softness and deformability, the right lateral piece 54 will be folded by the high-pressure air to cover a half surface of the stuffing strip 40. In addition, as outlets of left and right air nozzles 24, 22 are designed as a long-strip opening; the high-pressure air can uniformly blow onto the right lateral piece 54, such that the right lateral piece 54 can be folded in an accurate angle without creating wrinkles after being turned over.

Immediately following that the right lateral piece 54 has been turned over on the half surface of the stuffing strip 40, the slice food 50 will continue to move for a certain distance. At this time, only after the left lateral piece 52 completely covers the left air nozzle 24 that the left air nozzle 24 can start to eject upward the high-pressure air and to blow upward the left lateral piece 52. The left lateral piece 52 will be folded and turned over on a local surface of the right lateral piece 54 against the other linear stress mark 57, such that the local left lateral piece 52 and the local right lateral piece 54 are overlapped with respect to each other, and the left lateral piece 52 also covers the stuffing strip 40. At this time, a food enclosing material 500 is produced for a downstream operation.

Accordingly, the operation of folding the slice food 50 to cover the stuffing strip 40 is a very extraordinary achievement, wherein the technique applied to the slice food 50 completely eliminates the complex structure in the prior art and uses the blowing and suction of air to fold the left and right lateral pieces 52, 54 of the slice food 50.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A folding control apparatus for left and right lateral pieces of sliced food, comprising:
   a platform and a longitudinally extending transfer belt that moves horizontally along a specific direction cyclically and said transfer belt being divided into a central transfer belt, a right transfer belt, and a left transfer belt, and a first gap located between the right transfer belt and the central transfer belt, and a second gap located between the left transfer belt and the central transfer belt; a right air nozzle installed on a surface of the platform in correspondence with the first gap; a left air nozzle which is installed on the surface of the platform in correspondence with the second gap; more than one row of air suction grooves installed on the surface of platform, below the central transfer belt; and more than one row of through-holes, which are installed on the central transfer belt and in correspondence with the air suction grooves forming air suction passageways where the air is sucked in by the air suction grooves' through the through-holes.

2. The folding control apparatus for left and right lateral pieces of slice food according to claim 1, which includes a stuffing feeder including a transversal push plate that can be moved up and down intermittently under a pneumatic control;

an inner side of the push plate being provided with an outlet of a stuffing strip, allowing the stuffing strip to be exported from the outlet; when the push plate moving downward vertically, the stuffing strip being pushed onto a surface of moving sliced food.

3. The folding control apparatus for left and right lateral pieces of slice food according to claim 1, which includes two thin rolling disks fixed on left and right sides of a shaft, and two connection ends of the shaft are loosely connected on frames respectively; these two frames being fixed on two lateral surfaces of the platform, respectively; the two thin rolling disks being installed on the transfer belt in front of the stuffing feeder, and leaving gaps between the surface of the central transfer belt.

4. The folding control apparatus for left and right lateral pieces of sliced food according to claim 1, wherein the soft and deformable slice food is fed onto the surface of the transfer belt, and a left lateral piece is covered on surfaces of the second gap and the left transfer belt, and a right lateral piece is covered on surfaces of the first gap and the right transfer belt; the slice food moving along with the transfer belt, and when the moving sliced food passes through the gaps below the two rolling disks, the two rolling disks being passively rotated by a push of the slice food, so as to form a texture of linear stress marks that are spaced apart at a left and right side, on the surface of the sliced food.

5. The folding control apparatus for left and right lateral pieces of sliced food according to claim 1, wherein a primary bottom surface of the sliced food is drawn down by a suction effect of the air suction grooves through the through-holes, such that the sliced food is attached and positioned on the surface of the central transfer belt; the left air nozzle and the right air nozzle blowing out high-pressure air at a different time sequence through the first and, second gaps momentarily, and pausing; next, the left and right lateral pieces being folded against the linear stress marks at the different sequence, and being turned over at about 180°, such that the left and right lateral pieces are folded and overlapped on the surface of the stuffing strip, so as to form a food enclosing material.

* * * * *